June 1, 1943.  F. M. SMITH  2,320,667
PORTABLE CONVEYER
Filed March 20, 1940   2 Sheets-Sheet 1
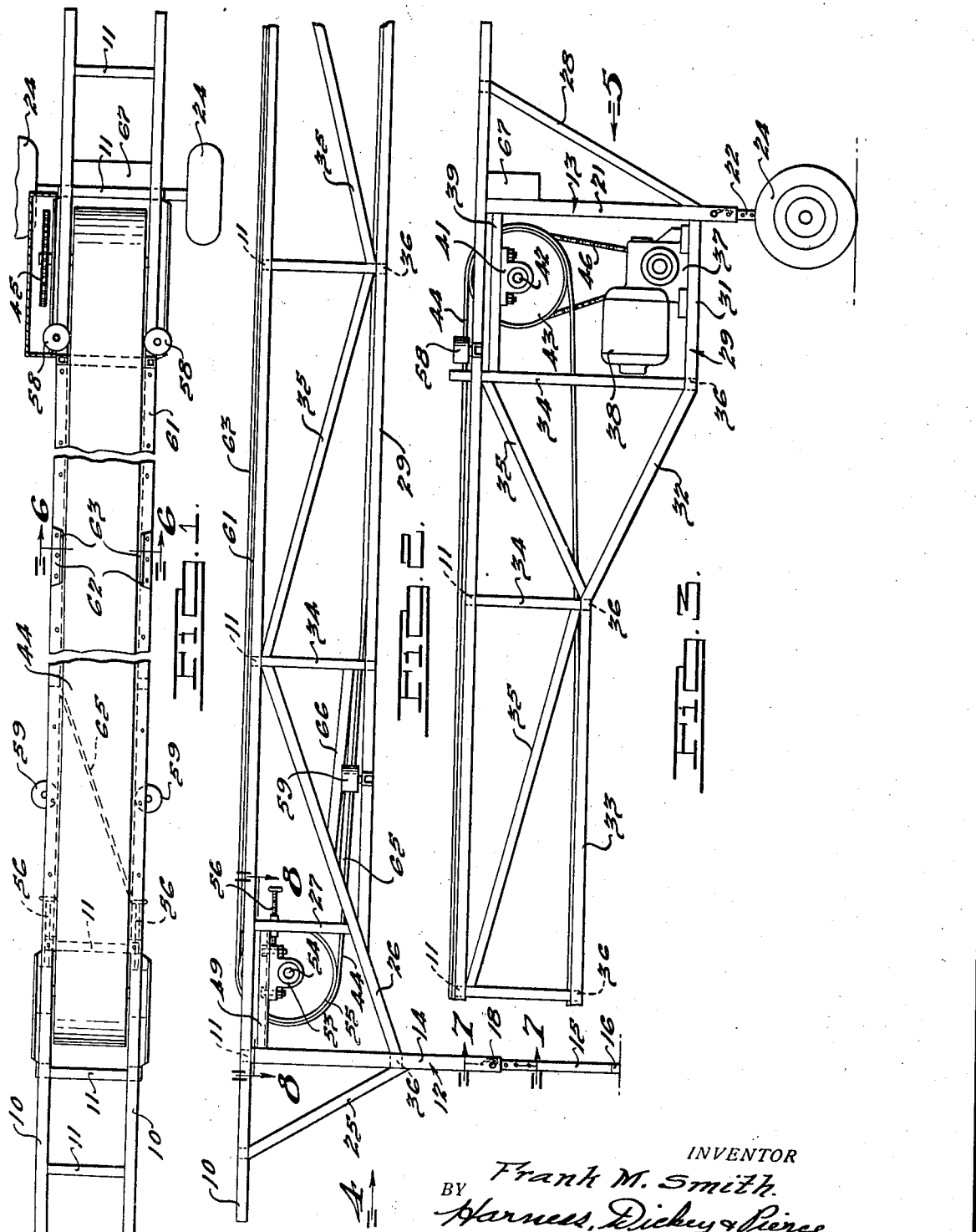
INVENTOR
Frank M. Smith.
BY Harness, Dickey & Pierce
ATTORNEYS.

June 1, 1943.   F. M. SMITH   2,320,667
PORTABLE CONVEYER
Filed March 20, 1940   2 Sheets-Sheet 2

INVENTOR
Frank M. Smith.
BY Harness, Dickey & Pierce.
ATTORNEYS.

Patented June 1, 1943

2,320,667

UNITED STATES PATENT OFFICE 2,320,667

PORTABLE CONVEYER

Frank M. Smith, Dearborn, Mich., assignor to Clippert Brick Company, Dearborn, Mich., a corporation of Michigan Application March 20, 1940, Serial No. 324,995

1 Claim. (Cl. 198—233)

My invention relates to belt types of conveyers and particularly to a conveyer of the portable type having the driving element incorporated in the portable frame which supports the conveying element.

The conveyer embodying my present invention comprises an elongated frame supported on wheels on one end and on legs on the other end, the legs and wheels being adjustable to regulate the height of the frame. A continuous belt extends about a pair of drums supported by the frame, and suitable driving mechanism is also attached to the frame and mounted in driving relation to one of the drums. The portable conveyer of this type lends itself to a wide variety of uses such as for advancing packages from a truck to a platform, or vice versa, and similarly from a truck to a railroad car or platform, as the case may be. I have particularly in mind the conveying of bricks from the kiln directly to railroad cars or to trucks for transportation. The conveyer materially reduces the effort required for handling the large number of bricks required to fill the car or truck.

Accordingly, the main objects of my invention are to provide a longitudinally extending frame with a pair of drums having a continuous belt driven by mechanism which is carried by the frame; to provide a longitudinally extending frame with adjustable wheels and legs at opposite ends, so that the belt carried by the frame may be adjusted in height at either end; to provide a frame having adjustable legs and wheels on opposite ends with drums which are adjustable relative to each other and which supports and drives a continuous belt from a mechanism carried by the frame to support the upper portion of the belt on a plate having flanges adjacent the belt edge for retaining articles in position on the belt; to provide a portable conveyer with a continuous length of belt and means for driving said belt for advancing articles from one to the other end thereof and maintaining the belt in aligned position by rollers in contact with the belt edges; and in general to provide a portable conveyer on a frame which is adjustable in height and driven through a prime mover carried by the frame, all of which is simple in construction, positive in operation, and economical of manufacture.

Other objects and features of novelty of my invention will be specifically pointed out or will become apparent when referring, for a better understanding of my invention, to the following description taken in conjunction with the accompanying drawings, wherein:

Figure 1 is a broken plan view of a portable conveyer embodying features of my invention;

Fig. 2 is an enlarged broken view in elevation of the lefthand portion of the conveyer illustrated in Fig. 1;

Fig. 3 is an enlarged broken view in elevation of the righthand portion of the conveyer illustrated in Fig. 1;

Figure 4:
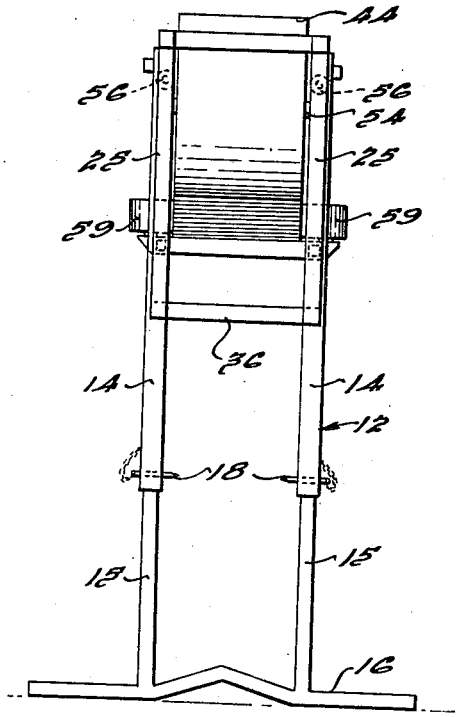
Fig. 4 is an end view of the conveyer illustrated in Fig. 3, as viewed from point 4 thereof.
Figure 5:
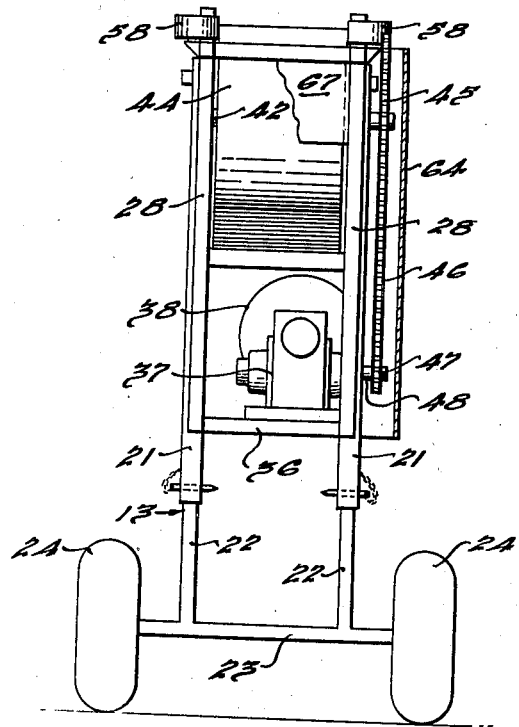
Fig. 5 is an end view of the conveyer illustrated in Fig. 3, as viewed from point 5 thereof.
Figures 6, 7, 8:
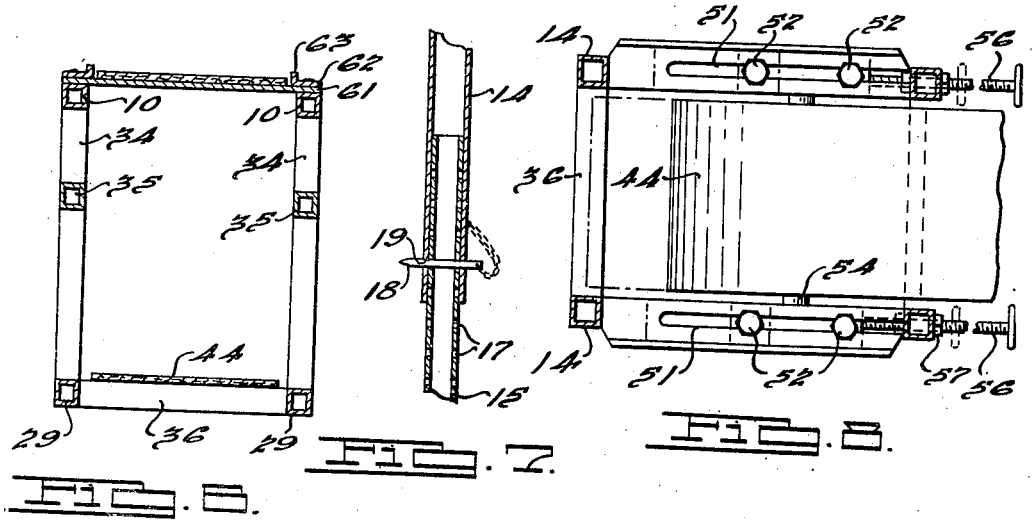
Fig. 6 is an enlarged sectional view of the structure illustrated in Fig. 1, taken on the line 6—6 thereof.
Fig. 7 is an enlarged sectional view of the structure illustrated in Fig. 2, taken on the line 7—7 thereof; and, Fig. 8 is an enlarged sectional view of the structure illustrated in Fig. 2, taken on the line 8—8 thereof.

Referring to the figures, I have illustrated the conveyer as having a frame which is made from tubular elements of steel, aluminum alloys, or the like. A pair of spaced top rails 10 are interconnected at spaced points by braces 11 and are supported near the end on the standards 12 and 13. The standard 12 comprising downwardly extending elements 14, which are welded to the underside of the top rail 10, have telescoping elements 15 projected therein which are welded to the ground engaging element 16. A plurality of apertures 17 are provided through the elements 15 in which a pin 18 projects when inserted through apertures 19 in the element 14.

Similarly, at the opposite end of the frame the standards 13 comprise downwardly extending elements 21 which are welded to the underside of the top rails 10 having the extending elements 22 adjustably telescoped therein. The elements 22 are welded or otherwise secured to an axle 23, which supports the wheels 24. The wheels 24 are preferably of the pneumatic type, as herein illustrated, and it is to be understood that a solid or flange type of wheel may be substituted therefor.

The standards 12 are braced by angular extending bracing elements 25 and 26, the latter being reinforced by braces 27 and 66. The telescoping elements 22 are adjustable relative to the elements 21 in a manner referred to hereinabove with regard to the structure illustrated in Fig. 4. The elements 21 of the standard 13 are braced by the angularly disposed tubular elements 28 and by the bottom rails 29, which are disposed horizontally at 31, projected upwardly at 32 and then horizontally at 33 parallel with the top rails 10, to be joined to the angularly disposed brace 26.

A plurality of vertically disposed bracing elements 34 join the top rails 10 with the bottom rails 29, the braces being interconnected by angularly disposed elements 35. Laterally disposed braces 36 interconnect the bottom rails 29 while the braces 11, mentioned hereinabove, interconnect the top rails 10. The horizontal portion 31 of the bottom rails 29 form a support for a speed reducing device 37 driven by a motor 38 which is connected to and supported thereon. While I have illustrated an electric motor 38 for driving the speed reducing device, it is to be understood that gasoline engines and other types of prime movers may be utilized for operating the conveyer.

Braces 39 interconnect the standards 13 and adjacent braces 34 to form a rigid support for bearing brackets 41 in which a shaft 42 is journalled. The shaft is attached to a drum 43 about which a continuous belt 44 is driven. A sprocket wheel 45 is keyed to the shaft 42 and interconnected by a chain 46 to a sprocket 47 keyed to the shaft 48 of the speed reducing device 37. Between the brace 27 and the support 12, braces 49 are mounted having a slot 51 therein through which bolts 52 project when supporting a bearing bracket 53. The bearing bracket forms a journal for a shaft 54 on which a drum 55 is mounted over which the conveyer belt 44 travels.

The braces 27 have adjusting screws 56 threaded in bosses 57 provided thereon, so mounted as to have the ends abut against the bearing brackets 53 for the purpose of positioning the brackets. The slack in the conveyer belt is taken up by loosening the bolts 52 and adjusting the screws 56 to advance the brackets in the slide to tension the conveyer belt a desirable amount. Thereafter the bolts 52 are tightened to retain the adjustment.

The conveyer belt is guided in its movement of advancement over the pulleys by a pair of rollers 58 secured to the top rail 10, and by a pair of rollers 59 secured to the bottom rails 29. On the top rail between the rollers 58 and the drum 55, a plate 61 is secured on which the belt is supported. Angle shaped elements 62 are riveted to the plate near the center of the frame with the flanges 63 thereof guiding the belt relative to the frame. A guard 64 encompasses the sprockets 45 and 47, and the chain 46 which provides a drive therebetween.

An angularly disposed wiping bar 65 engages the inner surface of the belt 45 adjacent to the roll 55 for the purpose of directing any particles from the edge of the belt as it advances to the roller 55 to prevent such particles from being carried around the roller by the belt. A box 67 is welded to the frame in which tools, the flexible cable from the motor, and the like, may be carried.

While I have described and illustrated but a single embodiment of my invention, it will be apparent to those skilled in the art that various changes, omissions, additions, and substitutions may be made therein without departing from the spirt and scope of my invention as set forth in the accompanying claim.

I claim as my invention:

A portable conveyer including parallel frame elements, cross members for spacing said frame elements and forming a top element, parallel frame elements disposed below said first named frame elements which are also joined by cross members forming a bottom element, said top and bottom elements being joined by vertical and diagonal braces, supporting legs joined to said top element inwardly of the ends thereof, bracing means for said legs joined to said top and bottom elements, adjustable foot portions disposed in said legs at the one end of the conveyer, wheels for the legs at the other end of the conveyer, means for adjustably mounting said wheels on said last legs, rollers carried between the top and bottom frame elements, a belt over the rollers resting on the top and bottom elements, and means for driving one of said rollers mounted on said conveyer.

FRANK M. SMITH.